United States Patent [19]

Giacomini et al.

[11] 4,174,162
[45] Nov. 13, 1979

[54] AERIAL CAMERA MOUNTING MEANS

[75] Inventors: Joseph M. Giacomini, Columbia, Md.; David E. Lichy, Woodbridge, Va.

[73] Assignee: The United States of America as represented by the Secretary of the Army, Washington, D.C.

[21] Appl. No.: 922,628

[22] Filed: Jul. 7, 1978

[51] Int. Cl.² .................. B64D 47/08; G03B 17/00; G03B 29/00; G03B 39/00
[52] U.S. Cl. .................. 354/70; 244/118 R; 354/74; 354/81; 354/293
[58] Field of Search .................. 354/70, 74, 81, 293, 354/295, 65, 67, 288; 352/132, 243; 244/118 R, 17.11

[56] References Cited

U.S. PATENT DOCUMENTS

| 1,423,364 | 7/1922 | Sharpe | 354/74 |
|---|---|---|---|
| 1,482,244 | 1/1924 | Morton | 354/74 |
| 1,517,550 | 12/1924 | Fairchild | 354/74 |
| 1,531,593 | 3/1925 | Brinsmade | 354/74 |
| 1,546,372 | 7/1925 | Fairchild | 354/70 |
| 2,630,983 | 3/1953 | Horne et al. | 244/1 R |
| 2,685,238 | 8/1954 | Baker | 354/74 |
| 2,713,609 | 7/1955 | Niklason | 354/293 X |
| 3,044,346 | 7/1962 | Fieux | 352/243 |
| 3,914,199 | 6/1974 | Dewitt | 244/118 R |
| 4,044,364 | 8/1977 | Prinzo | 354/74 |
| 4,114,839 | 9/1978 | Sibley et al. | 244/118 R |

Primary Examiner—L. T. Hix
Assistant Examiner—Thomas H. Tarcza
Attorney, Agent, or Firm—Thomas O. Maser

[57] ABSTRACT

An improved apparatus is disclosed for adjustably mounting an aerial photography camera externally of an aircraft, including a support adapted for attachment to the outside of an aircraft, an aerial photography camera, a control rod connected at one end with the camera, and a bearing device connecting the control rod with the support, said bearing device affording both rotation of the control rod about its longitudinal axis, and pivotal movement of the control rod about a generally horizontal pivot axis, whereby when the support is connected with the airplane, the camera may be adjusted to an orientation in which its optical axis extends vertically.

9 Claims, 6 Drawing Figures

U.S. Patent  Nov. 13, 1979  4,174,162
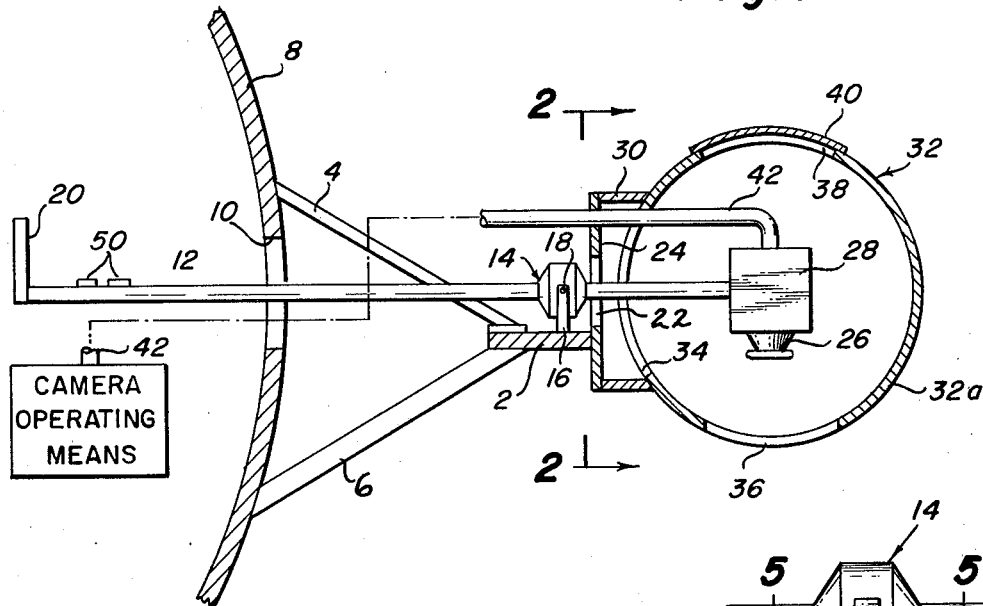
Fig. 1
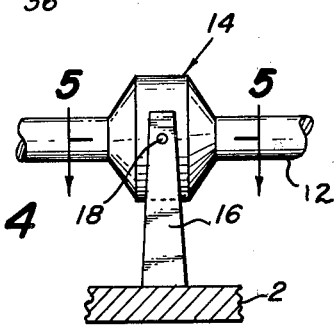
Fig. 4
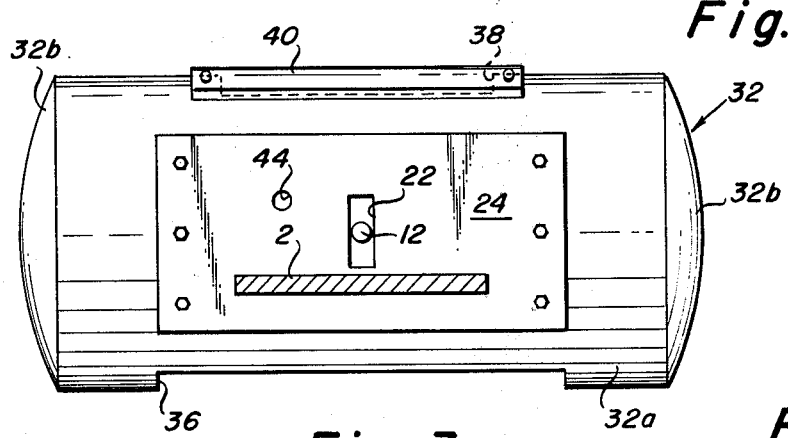
Fig. 2
Fig. 5
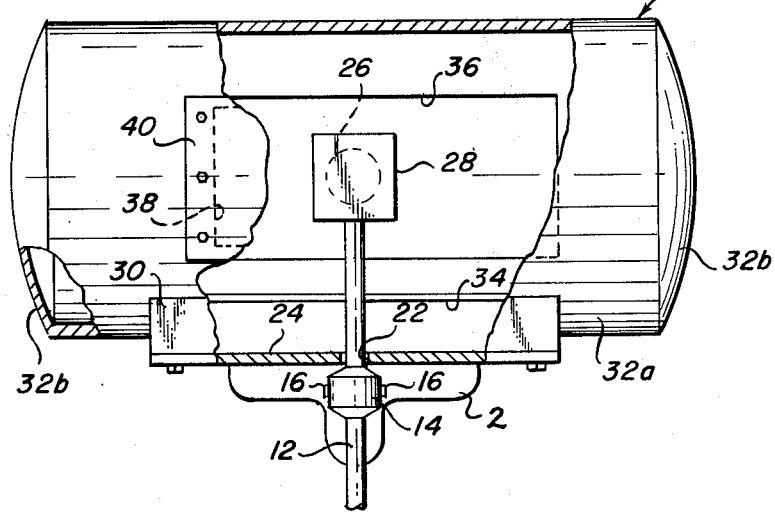
Fig. 3
Fig. 6

AERIAL CAMERA MOUNTING MEANS

BRIEF DESCRIPTION OF THE PRIOR ART

Various devices for mounting cameras for aerial photography are known in the art, as evidenced, for example, by the U.S. patents to Sharpe U.S. Pat. No. 1,423,364, Morton U.S. Pat. No. 1,482,244, Fairchild U.S. Pat. No. 1,517,550, Brinsmade U.S. Pat. No. 1,531,593, Horne et al U.S. Pat. No. 2,630,983, Baker U.S. Pat. No. 2,685,238, Fienx U.S. Pat. No. 3,044,346 and Dewitt U.S. Pat. No. 3,917,199.

When taking aerial photographs for use, for example, in map making, wherein several photographs must be pieced together to form a map, it is necessary that the photographs of the earth's surface be taken vertically so as to minimize scale distortion resulting from changes in the angle of the camera relative to the earth's surface. Owing to turning and climbing of the aircraft, as well as wind and other conditions operating on the aircraft, the horizontal position of an airplane while in flight is not constant. It is therefore necessary to have an apparatus for adjusting the position of an aerial camera so that consistent vertical aerial photographs can be obtained.

SUMMARY OF THE INVENTION

The present invention is directed to an improved apparatus for mounting an aerial photography camera on the outside of an aircraft so that accurate vertical aerial photographs may be obtained. The camera position is adjusted by means of a control rod which may be operated from within the aircraft. Level indicating means may be provided for assisting in orienting the camera so that its optical axis extends vertically.

In accordance with a primary object of the present invention, a mounting means is provided for adjustably mounting an aerial photography camera externally of an aircraft, whereby the camera may be oriented with its optical axis extending vertically. More particularly, the apparatus includes support means adapted for attachment externally of an aircraft, a control rod, bearing means connecting the control rod with the support means, and means for connecting a camera with one end of the rod. The bearing means supports the control rod both for rotational movement about its longitudinal axis as well as for pivotal movement about at least one axis normal to its longitudinal axis. One or more level bubble indicators may be provided for indicating the position of the camera relative to the earth's surface.

BRIEF DESCRIPTION OF THE DRAWING

Other objects and advantages of the invention will become apparent from a study of the following specification when viewed in the light of the accompanying drawing, in which:

FIG. 1 is a longitudinal cross sectional view of the aerial camera support means of the present invention;

FIG. 2 is a sectional view taken along line 2—2 of FIG. 1;

FIG. 3 is a partially broken away top view of the apparatus;

FIG. 4 is a detailed elevational view of the bearing means of FIG. 1;

FIG. 5 is a sectional view taken along line 5—5 of FIG. 4; and

FIG. 6 is a sectional view of a second embodiment of the bearing means.

DETAILED DESCRIPTION

Referring first to FIG. 1, the aerial photography apparatus of the present invention includes a horizontal support plate 2 that is mounted by upper and lower braces 4 and 6, respectively, externally of the aircraft 8 adjacent an opening 10 contained therein.

A control rod 12 is movably connected intermediate its ends with the support plate 2 by bearing means 14. As shown in FIG. 4, the bearing means 14 is pivotally connected with the support plate 2 by trunnion means 16 for pivotal movement about horizontal pivot axis 18, said bearing means also supporting said control rod for rotation about its longitudinal axis. At one end, the control rod 12 extends through the aircraft opening 10 and is provided with an operating handle 20. At its other end, the control rod extends through a vertical guide slot 22 contained in vertical face plate 24 that is rigidly secured to support plate 2. Aerial photography camera 26 is mounted on the free extremity of the control rod by camera mounting means 28. Connected with the face plate 24 by rigid brackets 30 is a hollow protective housing 32 that protectively encloses in spaced relation the camera 26. The housing 32 includes a horizontally arranged tubular body portion 32a, and a pair of convex end closure portions 32b. The tubular body portion 32a of the housing contains a side opening 34 which receives the control rod 12, a bottom viewing opening 36 which faces the ground, and a top access opening 38 (which is normally closed by cover member 40 as shown in FIG. 3). Control cable 42 extends from the camera operating means 44 to the camera 26 via aircraft opening 10, face plate opening 44 (FIG. 2), housing side opening 34, and a passage contained in the camera holder 28. A pair of orthogonally arranged bubble level devices 50 for indicating the orientation of the control rod 12 relative to the horizontal are mounted on the portion of the control rod 12 that extends within the aircraft.

In operation, the control rod 12 is rotated about its longitudinal axis and is pivoted about horizontal pivot axis 18 toward a position in which the optical axis of the camera 26 extends downwardly and generally vertically, whereupon the operator actuates the camera to photograph the image below the aircraft.

It is important to note that owing to the tubular configuration of the body portion 32a of the housing, together with the convex configuration of the housing end portions 32b, an aerodynamically stable assembly is provided that is readily connected with, and easily disassembled from, the aircraft.

It is apparent that various other types of bearing means might be provided, such as the universal joint bearing means 14' of FIG. 6. Other modifications may be made in the apparatus described above without deviating from the inventive concepts set forth herein.

What is claimed is:

1. Apparatus for adjustably mounting an aerial photography camera externally of an aircraft, comprising:
   (a) support means adapted for attachment externally of the aircraft;
   (b) a control rod;
   (c) an aerial photography camera connected with one end of said control rod;
   (d) a protective housing rigidly attached to said support means and enclosing said camera, said housing including a first opening for receiving the control rod and a second opening in the bottom thereof;

(e) bearing means connecting said control rod intermediate its ends with said support means, said bearing means supporting said control rod for rotational movement about its longitudinal axis and for pivotal movement about at least one axis normal to its longitudinal axis; and (f) handle means within the aircraft and connected with the other end of said control rod, whereby said control rod may be rotated and pivoted to a position in which the optical axis of said camera is vertical and passes through said second opening of said protective housing.

2. Apparatus as defined in claim 1, wherein said camera is connected with its optical axis extending normal to the longitudinal axis of said rod, said bearing means being operable to permit pivotal displacement of the rod to a horizontal position.

3. Apparatus as defined in claim 2, wherein said bearing means includes means connecting said control rod with said support means for pivotal movement about a single horizontal axis normal to the longitudinal axis of said rod, whereby when said support means has a horizontal orientation, the pivot movement of said rod is solely within a vertical plane.

4. Apparatus as defined in claim 2, and further including level means connected with said rod for indicating the orientation of said camera relative to the earth.

5. Apparatus as defined in claim 4 wherein said level means comprises a pair of orthogonally arranged level bubble indicators.

6. Apparatus as defined in claim 5, and further including means operable when said support means has a horizontal orientation for limiting pivotal movement of said rod within a vertical plane.

7. Apparatus as defined in claim 6, wherein said limiting means comprises vertical guide means connected with said support means for cooperating with said control rod to restrict the vertical movement thereof in the vertical plane.

8. Apparatus as defined in claim 7, wherein said vertical guide means includes a vertical plate connected with said support means, said plate containing a vertical slot through which said control rod extends.

9. Apparatus as defined in claim 8, wherein said bearing means comprises universal ball and socket bearing means.

* * * * *